UNITED STATES PATENT OFFICE.

EDWARD W. DUCKWALL, OF ASPINWALL, PENNSYLVANIA.

PROCESS FOR PREVENTING THE SPOILAGE OF CANNED FOODS.

1,114,972. Specification of Letters Patent. Patented Oct. 27, 1914.

No Drawing. Application filed March 29, 1913. Serial No. 757,722.

*To all whom it may concern:*

Be it known that I, EDWARD W. DUCKWALL, citizen of the United States, residing at Aspinwall, in the county of Allegheny and State of Pennsylvania, have invented certain new and useful Improvements in Processes for Preventing the Spoilage of Canned Foods, of which the following is a specification.

This invention relates to an improved process for preventing the spoilage of canned food, and has for its primary object a provision of a simple, effective and inexpensive process, whereby the destruction of living, previously undestroyed bacteria will be absolutely assured, so that the food may be indefinitely preserved in an edible condition.

The invention further has for its object an improved process whereby the above result may be successfully accomplished without deleteriously affecting the hermetically sealed foods in regard to their flavor and quality.

Before proceeding with a detailed description of my improved process, a statement regarding the ordinary methods of sterilization employed by canners will be given to materially assist in disclosing the advantages of my process and thus arriving at a clear and full understanding of its efficiency in practical use.

All canners of food products endeavor to use a sterilizing process which will consume as little time as possible, and with a sterilizing heat no higher than thought to be necessary, or as close to the danger line as possible, because over-heating of the foods usually injures their flavor, therefore the sterilizing temperatures are kept as low as possible with considerable guess-work as to the efficiency, usually basing the time and temperature on past experience as an index or a rule, which very frequently does not prove adequate. In case the primary sterilizing process has been insufficient to secure complete sterilization, some of the bacteria in spore form will survive, and the heat used in the primary process has a tendency to start the development of the undestroyed spores of these bacteria.

All canned foods having an acidity of less than one-quarter of one per cent. are liable to spoilage, if not sufficiently sterilized in the primary process, by the development of the undestroyed spores of bacteria, and this class of bacteria is always the cause of spoilage in goods of this acidity or less. Spoilage in this case is due to two classes of spore-bearing bacteria. One of these classes is anaerobic and produces malodorant gases, said gases causing what is known in canning vernacular as "swells." The other class produces principally lactic acid, and only a very small quantity of gas, not sufficient to swell the can, and causes what is known in canning vernacular as "flat sours". This latter class may grow either aerobically or anaerobically, and breaks up the sugar into lactic acid. Both of these classes of bacteria are normally present in such food as has an acidity of less than one-quarter of one per cent., being present in the form of spores which require a higher degree of heat than the boiling point of water to insure their destruction in any primary sterilizing process when present in hermetically sealed cans containing food of less than one-quarter of one per cent. acidity.

Such foods as are subject to spoilage through the action of non-spore-bearing bacteria or through yeasts and molds usually have an acidity of more than one-quarter of one per cent., and it will be understood that the process which is hereinafter described is equally applicable to both kinds of canned food, whether affected with spore-bearing bacteria or non-spore-bearing bacteria, yeasts and molds. Such canned foods are usually given a primary sterilizing process in boiling water or live steam, etc. at about 212 degrees Fahrenheit.

Having above described the sterilizing processes to which canned food products are usually subjected at the cannery, and shown that such processes not only fail in many cases to destroy the bacteria present in the food, but on the other hand promote their development, I will now state how I propose to effectively destroy the living bacteria developed from the spores and the non-spore-bearing bacteria softened by the liquid, also the yeasts and molds, and prevent the spoilage of all such canned goods.

It is to be borne in mind that the character of the original sterilizing process to which the canned foods have been subjected is immaterial, and it makes no difference whether the original process was in a closed steam retort or process kettle, agitating retort systems, calcium baths, oil baths, paraffin baths, insufficient fractional sterilization, electric sterilization, pressure sterilization or any primary process of any description.

or boiling water process. My proposed invention may be efficaciously employed irrespective of any previous process or processes to which the canned foods may have been subjected, whether such canned foods were hermetically sealed in tin, glass or other hermetical container, providing those primary sterilizations are shown to have failed to kill the micro-organisms.

My process is as follows: From the warehouse in which the canned foods are stored as fast as they are packed, a number of cans are taken representing different blocks of the freshly stored cans, and these samples are placed in an incubator maintained at about blood temperature. There they are kept for various lengths of time varying in accordance with the particular kinds of food and their density. For instance, corn, peas, string beans, asparagus and such other foods as contain a comparatively large quantity of water will be allowed to remain in the incubator for a period of about three (3) days, while foods such as squash, pumpkin, baked beans with tomato sauce, spinach, sweet potatoes and other products of relatively great density and containing but little water will require an incubation period of from ten days to two weeks, to determine whether or not the original sterilizing process or processes were sufficient to kill or destroy the bacteria in the sealed container. The bacteria, if undestroyed, will grow more or less rapidly in the incubator where a temperature of blood heat is maintained, and much faster than in the corresponding blocks of goods in the wareroom where the temperature will be materially less, so that the undestroyed bacteria will show up in the incubated samples before spoilage has occurred in the wareroom. The spoilage in the wareroom will be sure but gradual at the lower temperature and it is to prevent this spoilage that we proceed in my process with an incubation of the samples from the wareroom.

After incubation, which is the first step of the process, the cans are opened and a quantity of the contents removed therefrom at about the center of the container. A suitable microscopic preparation is made of this and examined under the microscope with a suitable power for seeing bacteria, yeasts and molds which have developed in the container under the forced growth in the incubator, and the microscopic examination will show the presence of such organisms if developed. When bacteria are found it may be definitely ascertained whether or not they are living or dead by inoculating regular bacteria media commonly used in bacteriological laboratories. It is essential to know that they are living. Having thus disclosed the presence of living bacteria, in the canned food the corresponding lots in the wareroom are saved from spoilage by subjecting them to a boiling water process or its equivalent for various lengths of time according to the size of the can and the character of the canned food and the density of said food. The time for which the cans are allowed to remain in the boiling water baths varies from one to two hours, or sufficient to produce a temperature of 180 degrees Fahrenheit, or more at the center of the can.

Although it may have been originally necessary to use a temperature far above that of boiling water in an attempt to thoroughly sterilize the canned food, yet I have discovered that a second process in boiling water after the presence of living micro-organisms have been discovered and (in the time necessary to secure incubation and microscopic examination), will be sufficient to secure complete sterilization, even where a higher temperature up to 250 degrees Fahrenheit or more has originally failed to accomplish the desired end. The reason for this is apparent.

As before stated, in the primary process or processes the spores which are very hard to kill, which are heat-resisting even to very high temperatures, $i.$ $e.$, such temperatures as may be given without affecting the quality, often survive. The heat held by the can after such sterilization and the liquid in the can serves to further the development of the spores into bacteria and soften any other organisms which may have survived a primary process of any description. Therefore, after the lapse of such time as may be required to make an incubation and microscopic test, these organisms will be in such physical shape to be easily destroyed by my secondary process, which is of such comparatively low temperature that it will not injure the quality of the canned food, but will be of sufficient intensity to destroy all such organisms as have survived the primary process. It will thus be seen that by testing the contents of a few cans under the microscope after they have been removed from the incubator as described, my process will prevent the spoilage of large quantities of canned foods which may be stored in the warerooms by simply subjecting the same to a secondary process or re-cooking by passing the same through a bath of boiling water or its equivalent in order to get a temperature of 180 degrees Fahrenheit at the center of the can as previously described.

It will be apparent that owing to the comparatively low temperature of the water, steam or other medium in re-cooking the canned food, the same will not cause any deterioration in quality, but will effectively and completely destroy the micro-organisms whether they were originally spore-bearing or non-spore-bearing.

From the foregoing, it is believed that the nature of my improved process and the manner in which the same is to be practically applied will be clearly and fully understood. By means of the same I aim to prevent spoilage of large quantities of canned foods owing to the development of living bacteria therein, as is now experienced by nearly all packers of canned foods.

After the canned foods have been subjected to my improved process, they may be indefinitely preserved in an edible condition. It is of course to be understood that it is not essential that the cans be placed in a bath of boiling water, but they may be subjected to heat in any other manner, it being only necessary that the food at the center of the can attain a temperature of approximately 180 degrees to insure the destruction of all living bacteria therein.

Having thus described the invention, what is claimed is:

1. A process for preventing the spoilage of previously processed solid or semi-solid foods packed in hermetically sealed containers which consists in subjecting representative sample containers to an incubating heat to develop such bacteria as may be present in the food, then examining the food to ascertain the existence or non-existence of developed living bacteria therein, whereby, if any bacteria are found, it will be disclosed that undeveloped bacteria exist in the remaining containers, from which the samples were taken, and finally subjecting the remaining containers to one single re-cook at a temperature approximating that of approximately boiling water for a sufficient time to convey a temperature of 180 degrees Fahrenheit to the center of the containers whereby the bacteria are killed.

2. A process for preventing the spoilage of previously processed solid or semi-solid foods packed in hermetically sealed containers which consists in subjecting representative sample containers to an incubating heat for a period of time varying inversely with the fluidity of the food in the container from three days to two weeks to develop any living bacteria in the food, then removing a portion of the food from the approximate center of the container and examining the same to definitely ascertain the presence of living bacteria, and should such bacteria be found thus disclosing that undeveloped bacteria of a similar character exist in the remaining bulk of containers, then subjecting the remaining containers to a temperature approximating that of boiling water for a sufficient time necessary to convey a temperature of approximately 180° Fahrenheit to the center of the containers.

3. A process for preventing the spoilage of solid or semi-solid foods packed in hermetically sealed containers which consists in subjecting sample containers taken from freshly packed goods to an incubation for a predetermined length of time to develop any bacteria present therein, then opening the sample containers, taking a sample from the center thereof, and examining the same to definitely determine the presence of living bacteria and, if living bacteria are found thus disclosing that like bacteria exist, in a less developed form, in the remaining containers from which the samples were taken, then subjecting said remaining containers to a boiling water bath or its equivalent for a sufficient time to convey a temperature of approximately 180° Fahrenheit to the center of the containers.

In testimony whereof I hereunto affix my signature in the presence of two witnesses.

EDWARD W. DUCKWALL.

Witnesses:
A. L. NEHLS,
E. R. LONG.